United States Patent Office 2,916,475
Patented Dec. 8, 1959

2,916,475

POLYAMIDES OF XYLENEDIAMINE AND AN ALIPHATIC DIBASIC ACID UP-GRADED WITH TRANS - 1,4 - CYCLOHEXANEDICARBOXYLIC ACID OR OXALIC ACID

John R. Caldwell and Russell Gilkey, Kingsport, Tenn., assignors to Eastman Kodak Company, Rochester, N.Y., a corporation of New Jersey No Drawing. Application October 24, 1956
Serial No. 617,902

16 Claims. (Cl. 260—78)

This invention relates to improved linear highly polymeric fiber-forming copolyamides of the class comprising either or both of the meta and para isomers of xylene-$\alpha,\alpha'$-diamine condensed with two bifunctional dicarboxy compounds. One of these dicarboxy compounds is an aliphatic dicarboxy compound containing from 6 to 12 carbon atoms which serves as a component of at least 25 percent of the recurring structural units in the copolyamides, and the other is a compound which serves as a component in recurring upgrading structural units having the following formula:

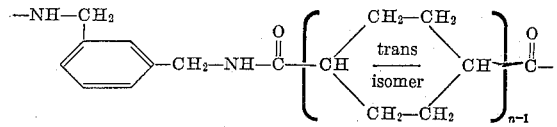

wherein $n$ represents a positive integer of from 1 to 2. This formula pertains to up-grading units derived from meta-xylene-$\alpha,\alpha'$-diamine with which this invention is most particularly concerned; however, this invention also covers those derived from the para isomer or mixture of meta and para-xylene-$\alpha,\alpha'$-diamine. This invention also relates to the preparation of these improved copolyamides. They are characterized by having higher melting points than the homopolyamides which contain none of the recurring up-grading structural units. The copolyamides of this invention have melting points which are generally well above 150° C. and are in many instances well above 200° C. Some of the copolyamides of this invention have melting points of about 300° C. or higher. The copolyamides having the higher melting points are characterized by sticking temperature well above the sticking temperatures of 6-nylon and nylon 66 which are currently in commercial production for textile use.

Although both oxalic acid and trans-1,4-cyclohexanedicarboxylic acid serve similar functions in the recurring up-grading structural units of this invention, it is obvious that they are primarily equivalents to only that extent, especially since they are distinctly different chemical compounds and their equivalence shown herein has been unexpectedly discovered for the first time.

It is apparent that the up-grading of homopolyamides derived from xylene-$\alpha,\alpha'$-diamine in accordance with the invention serves to make available improved polyamides of this class. It further serves to up-grade those polyamides which may formerly have been considered worthwhile but which can now be further improved to a significant degree.

This invention was quite unexpected in view of the fact that it represents an exception to Flory's rule. This rule is discussed at considerable length by Flory in J. Am. Chem. Soc. 72, 2024 (1950). The theoretical derivation is given, along with considerable experimental verification. This melting point rule has been widely accepted in the field of polymer science and in fact, is often called Flory's melting point "law." The general validity of this rule has been established for polyesters, polyamides, and vinyl polymers. The copolyamides disclosed herein and those described in certain copending applications referred to herein represent exceptions to Flory's rule. By virtue of these exceptions, the very important discovery has been made that certain classes of polyamides can be up-graded and their utility thereby increased. See copending applications, Serial Nos. 617,903, filed by the inventors herein, and 617,931, filed by Bell, Smith and Kibler on even date herewith.

In the literature citation given above, Flory shows that the addition of any other component to a polyamide will lower the melting point of the polyamide, even if a high-melting component is added. According to this rule, if component A is added during the formation of polymer B, the melting point of the resulting copolymer will be depressed. According to the definitions used by Flory, a copolyamide is named according to the component that is present in the larger amount on a molar basis. That is, a copolyamide that contains more than 50 mole percent of adipic acid and less than 50 mole percent of sebacic acid is considered to be a modified adipic acid polyamide and the sebacic acid is considered as the component which depresses the melting point of the adipic acid polyamide. The same reasoning prevails if the polyamide contains mixed diamines. Flory states that the melting point depression is very nearly independent of the co-ingredients used.

For the purpose of further illustrating Flory's rule, some data is presented in the table below. In this table the co-ingredient is described as 6–10, 6–6, etc. wherein the first figure refers to the number of carbon atoms in a straight-chain diamine and the second figure represents the number of carbon atoms in a straight-chain dibasic acid. Thus, 6–6 is nylon 66 and 10–6 is polymerized decamethylene adipamide.

COPOLYAMIDES OF DECAMETHYLENE SEBACAMIDE

| Co-Ingredient | Mole Fraction of Decamethylene Sebacamide | Melting Point, ° C |
|---|---|---|
| None | 1.0 | about 209 |
| 10-Terephthalic | 0.9 | 203–204 |
| 6–10 | 0.9 | 203–204 |
| 6–10 | 0.8 | 195–197 |
| 10–6 | 0.8 | 195–197 |
| 10-Isophthalic | 0.8 | 195–197 |
| 6–6 | 0.8 | 195–197 |
| 6–10 | 0.7 | about 188 |
| 6–10 | 0.6 | about 181 |

It can be seen from this table that the melting point of the homopolymer (209° C.) is depressed in a regular manner, depending upon the mole fraction of the co-ingredient present, even though the co-ingredient melts higher than the homopolyamide, for example, 6–6 melts at 264° C. and 10-terephthalic melts above 300° C. and yet, as a co-ingredient, each of these reduces the melting point of the homopolyamide to well below 209° C.

It has been noted that the copolyamide of adipic acid and terephthalic acid with hexamethylenediamine does not show the depression of melting point that would be predicted from Flory's rule. However, these two acids are almost identical in chain length and hence give isomorphous crystals. That is, they both fit into the same crystal lattice and there is no disturbance of the crystal structure. The physical-chemical laws of melting point depression do not apply to isomorphous systems. It does not appear that any of the modifying agents used in the copolyamides of the present invention give isomorphous systems.

The polyamides of meta- and para-xylene-$\alpha,\alpha'$-diamine are known in the art and are referred to broadly in the earlier patents of Carothers such as U.S. 2,130,523, U.S. 2,130,948, etc., and in other related earlier patents such as U.S. 2,245,129 and U.S. 2,181,663. Meta-xylene-α,α'-diamine is a potentially cheap diamine and would be quite valuable as a component for the preparation of polyamides for general textile use except, primarily, for the fact that polyamides melt at temperatures which are undesirably low for most fiber and film purposes. For example, the homopolyamide made with adipic acid melts at 230° C., which is undesirably low for a textile fiber. Thus, the up-grading accomplished in accordance with this invention is quite important to the broad commercial utilization of meta-xylene-α,α'-diamine especially for textile purposes.

Moreover, by upgrading these polyamides, it has been quite surprisingly discovered that the physical and chemical characteristics, especially the initial tensile moduli, are such that the copolyamides formed are excellent in forming fibers which can be employed in tire cords.

Since the meta-isomer of xylene-α,α'-diamine is, among other things, the least expensive and most readily available isomer, this invention is primarily directed toward the employment of the meta-isomer in the preparation of the copolyamides being upgraded as described herein. However, valuable copolyamides can be formed employing a mixture of the para-isomer of xylene-α,α'-diamine along with the meta-isomer.

The following tabulation will serve to illustrate the effect of the improvement of this invention on the class of polymers derived from m-xylene-α,α'-diamine employing adipic acid as the aliphatic dicarboxy compound containing from 6 to 12 carbon atoms. Included in this tabulation are copolyamides wherein the third component is terephthalic acid thereby resulting in the usually expected depressed melting point.

COPOLYAMIDES OF M-XYLENE-α,α'-DIAMINE AND ADIPIC ACID WHEREIN A PART OF THE ADIPIC ACID IS REPLACED WITH THE INDICATED MODIFIER

| Modifier | Mole percent of Modifier | Melting Point of Copolyamide, ° C. |
| --- | --- | --- |
| a. None | 0 | 230 |
| b. Trans-1,4-cyclohexanedicarboxylic acid | 15 | 245 |
| c. Trans-1,4-cyclohexanedicarboxylic acid | 20 | 275 |
| d. Trans-1,4-cyclohexanedicarboxylic acid | 30 | 300 |
| e. Trans-1,4-cyclohexanedicarboxylic acid | 50 | 320 (dec.) |
| f. Oxalic Acid | 20 | 280 |
| g. Terephthalic Acid | 20 | 215 |

It is to be noted that the terephthalic acid served to lower the melting point of the polyamide even though the melting point of a homopolyamide formed from terephthalic acid and m-xylene-α,α'-diamine has a very high melting point well above 230° C. This is the usual result which would be predicted from Flory's rule.

It has also been found that if the adipic acid in the above tabulation of data (as in items b and c) is replaced with isophthalic acid, there is produced an opposite effect wherein the trans-1,4-cyclohexanedicarboxylic acid does not co-act with the isophthalic acid so as to upgrade the melting point. This follows according to Flory's rule. Thus, a copolyamide derived from heating 0.25 mole of trans-1,4-cyclohexanedicarboxylic acid and 0.75 mole of isophthalic acid with 1.0 mole of m-xylene-α,α'-diamine as in the procedure described in Example 1 set forth hereinbelow produced a polyamide which melted in the range of 160°–175° C. When the mole proportion of trans-1,4-cyclohexanedicarboxylic acid was reduced to 20% the melting point was 175°–187° C. and upon increasing it to 40% the melting point was 145°–165° C. Thus, it is apparent that trans-1,4-cyclohexanedicarboxylic acid is not inherently an upgrading component but only functions as such in combination with certain dicarboxylic acids such as are set forth in this specification.

The fibers spun from the above copolyamide containing 20 percent of trans-1,4-cyclohexanedicarboxylic acid and 80 percent adipic acid have the following properties which are compared with the corresponding properties of nylon 66.

| Property | Up-Graded Copolyamide | Nylon 66 |
| --- | --- | --- |
| Tenacity, grams/denier | 4–5 | 5–6 |
| Elongation, percent | 15–20 | 15–20 |
| Sticking temperature, dec. C. | about 235° | about 220 |
| Initial tensile modulus, gm./100 denier | 70 | about 40 |

As can be seen, the corresponding properties for nylon 66 are essentially the same as for this upgraded copolyamide of this invention except for the improved tensile modulus which makes this copolyamide of this invention superior for use in tire cords.

As already mentioned, many of the copolyamides produced in accordance with this invention have excellent value in the formation of fibers for employment in tire cords. Previously known useful polyamide fibers which have been used to some extent in tire cords have not been fully satisfactory since the tensile modulus of those which have been commercially available, such as nylon 66, have only had values of from about less than 30 up to about 40 for certain special fibers specifically designed for use in tire cords.

The initial tensile modulus of elasticity referred to throughout this specification is the stress in grams per denier, measured at 1% elongation, multiplied by 100, i.e. it is in units of gm./100 denier.

The fibers produced in accordance with this invention have in many instances a tensile modulus as high as 70 or higher and are therefore quite worthwhile as fibers for the preparation of tire cord. A high modulus is particularly important in tire cord since under heavy loads, a low-modulus tire cord tends to stretch excessively, thus leading to growth or permanent distortion of the diameter of the tire. Furthermore, a tire tends to develop temporary flat spots when the vehicle is parked for a long period of time. These flat spots persist for several miles of travel and cause an annoying bump as the wheels of the vehicle revolve which serves to reduce the comfort of traveling as well as increasing the maintenance of the vehicle as a result of the excessive vibration. It is well known that nylon tire cords now in use are subject to these deficiencies even though they have high tensile strength. The modulus of the copolyamides described herein is in the range of about 70 or higher which is even higher than that of cotton and viscose which have a modulus of about 55–65 which is the highest modulus of any tire cord in current commercial use.

It is an object of this invention to provide improved upgraded linear highly polymeric fiber-forming copolyamides derived from the meta- or para-isomer (especially the meta-isomer) of xylene-α,α'-diamine and two bifunctional dicarboxy compounds.

It is a further object of this invention to provide a process for preparing such upgraded copolyamides by means of the known process steps for preparing related polyamides with the exception that a substantial proportion of one of the components is replaced with an upgrading component or co-ingredient as defined herein.

It is a further object to provide fibers, films and other articles of manufacture having improved melting points and other physical and chemical characteristics resulting from the upgrading of certain polyamides in accordance with this invention.

Other objects will become apparent hereinafter.

According to one embodiment of this invention, we have found that a great improvement can be achieved in regard to the linear highly polymeric fiber-forming copolyamides of the class consisting of polymers derived from at least one of the meta- and para-isomers of xylene-α,α'-diamine including from about 50 to 100 percent of the meta-isomer condensed with two bifunctional dicarboxy compounds, one of which is an aliphatic dicarboxy compound containing from about 6 to about 12 carbon atoms which forms a component of at least 25 percent of the recurring structural units in the copolyamide, which improvement is achieved by having the other bifunctional dicarboxy compound serve as a component in recurring upgrading structural units having the formula given hereinabove.

According to another embodiment of this invention the novel copolyamides of this invention can be prepared by a process which essentially comprises condensing meta-xylene-α,α'-diamine with two bifunctional dicarboxy compounds, one of which is an aliphatic dicarboxy compound containing from about 6 to about 12 carbon atoms which constitutes at least 25 mole percent of said bifunctional dicarboxy compounds, and the other had the following formula:

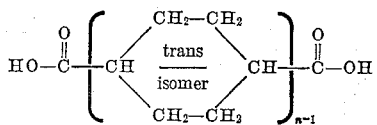

wherein $n$ represents a positive integer of from 1 to 2, which copolyamide is characterized by a melting point higher than the corresponding homopolyamide derived from meta-xylene-α,α'-diamine and the aliphatic dicarboxy compound containing from 6 to 12 carbon atoms.

The condensation can generally be advantageously accomplished by heating the xylene-α,α'-diamine with the two bifunctional dicarboxy compounds or a suitable derivative thereof under conditions that will produce a polyamide. Most advantageously, salts of xylene-α,α'-diamine and the bifunctional dicarboxy compounds can be formed and then heated at an elevated temperature of from about 200° to about 300° C. for several hours in a closed vessel in an inert atmosphere. Thus, the purified salts of xylene-α,α'-diamine and the two bifunctional dicarboxy compounds can be placed in an autoclave including from 10 to 25 percent of water. The autoclave can then be closed and the mixture advantageously heated at 210–270° C. for several hours to produce a low-molecular weight copolyamide. A high-molecular weight polymer can then be obtained by further heating this product at atmospheric pressure under an inert atmosphere or in a vacuum. The employment of purified salts insures that the diamine and the dicarboxylic acid are employed in equivalent amounts. Solvents such as cresol or xylenol can be employed during the reaction. Other techniques can be used in preparing the copolyamides of this invention. Such techniques are well known in the art and are illustrated in numerous patents and publications. It is not believed necessary or desirable to go into all of the variations and ramifications which can be employed in preparing the copolyamide of this invention.

The copolyamides of this invention can be formed into fibers, films, extrusions, molded objects, coating compositions, etc. using those techniques well known in the art for melt-spinning, extruding, etc.

In order to be suitable for the manufacture of films, fibers, sheets, and molded objects, the copolyamide should have an inherent viscosity of about 0.4 or higher. Generally, such a viscosity of from 0.6 to 0.8, as determined in a solvent composed of 60 parts of phenol and 40 parts of tetrachloroethane produces a copolyamide of quite advantageous characteristics. In some instances where a particularly high inherent viscosity is not desired, it may be desirable to add a chain terminator or stabilizer such as acetic acid or benzoic acid to the reaction mixture in order to keep the viscosity from exceeding the desired range.

The aliphatic dicarboxy compounds containing from 6 to 12 carbon atoms which can be employed in accordance with this invention are illustrated by adipic acid, pimelic acid, suberic acid, azelaic acid, sebacic acid, dodecane-1,12-dioic acid, 3-methyladipic acid, and other dicarboxylic acids having from 1 to 2 methyl groups attached to the main hydrocarbon chain in a position preferably not in alpha relationship to a carboxy radical, e.g. 4-methyladipic acid, 5-methylsuberic acid, 3,3-dimethyl adipic acid, etc. Although this invention is primarily concerned with those aliphatic dicarboxy compounds containing from 6 to 12 carbon atoms, the polyamides can also be upgraded wherein the dicarboxy compound contains fewer or more carbon atoms, e.g. dimethylmalonic acid, 3-methylsuccinic acid, brassylic acid, etc.

This invention can be further illustrated by the following examples of preferred embodiments although it will be understood that these examples are included merely for purposes of illustration and are not intended to limit the scope of the invention unless otherwise specifically indicated:

Example 1.—Copolyamide

Three mole proportions of m-xylene-α,α'-diammonium adipate (salt of m-xylene-α,α'-diamine and adipic acid) plus 2 mole proportions of m-xylene-α,α'-diammonium trans-cyclohexane-1,4-dicarboxylate were mixed together and 150 grams of this mixture together with 51 ml. of water containing 0.015 gram of acetic acid were placed in a steel autoclave. The autoclave was purged with nitrogen, heated to 120° C. and further purged of air by blowing off a small amount of steam. It was then closed and heated with shaking for about 20 minutes at 250° C. The autoclave was cooled and the low-molecular weight copolyamide was tranferred to a reaction vessel equipped with a stirrer, a short distillation column and an inlet for purified nitrogen. The mixture was heated at about 250° C. with stirring until the excess water was eliminated and the temperature was then gradually increased in order to maintain a clear melt. The stirred melt was finally heated for about 30 minutes at about 300° C. under a vacuum of about 0.2 mm. A high-viscosity colorless polyamide was obtained which had a crystalline melting point of 280–294° C. This copolyamide was melt-spun to form fibers having excellent physical and chemical characteristics as discussed hereinabove (initial modulus: 70–72).

Example 2.—Copolyamide

The procedure described in Example 1 was repeated employing 40 mole percent of the m-xylene-α,α'-diamine salt of 3-methyladipic acid and 60 mole percent of the m-xylene-α,α'-diamine salt of trans-cyclohexane-1,4-dicarboxylic acid. The copolyamide which formed had a crystalline melting point of 260–273° C. This copolyamide was melt-spun to form fibers having excellent physical properties and was melt-extruded to form film which had similarly excellent characteristics. These films were excellent wrapping materials and could be used as supports for photographic silver halide gelatin emulsions of either the color or the black-and-white types.

Example 3.—Copolyamide

A copolyamide was prepared employing the general procedure described in Example 1 using the m-xylene-α,α'-diamine salts of sebacic acid (0.8 mole proportion) and trans-1,4-cyclohexane-dicarboxylic acid (0.2 mole proportion). This copolyamide melted in the range of from 210° C. to about 225° C. This is about 20° higher than the homopolymer made from sebacic acid and m-xylene-α,α'-diamine. The copolyamide of this example was melt-spun to form strong elastic fibers.

This copolyamide was shaped into transparent molded objects. This copolyamide was soluble in aqueous alcohol and aqueous acetic acid.

*Example 4.—Copolyamide*

A copolyamide was prepared in accordance with the procedures described above employing m-xylene-α,α'-diamine plus 0.8 mole proportions of adipic acid and 0.2 mole proportions of trans-1,4-cyclohexanedicarboxylic acid. The resulting copolyamide melted in the vicinity of 275° C. The fibers were spun by the melt-spinning process and drafted 400–500 percent. They were then heat-set in steam at 120–140° C. They had the following properties: tenacity of 4.8 grams per denier, 16 percent elongation, tensile modulus of 70, and hot bar sticking temperature of 235° C. The tensile modulus of the polyamide made from adipic acid and m-xylene-α,α'-diamine was 45–50, whereas the elastic modulus measured in the same way for nylon 66 is about 40 which is approximately the same as for 6-nylon. Thus, the fibers produced in accordance with this example are of greatly improved value for the manufacture of heavy-duty tire cord.

*Example 5.—Copolyamide*

A copolyamide was made from m-xylene-α,α'-diamine employing 0.5 mole proportions of adipic acid and 0.5 mole proportions of trans-1,4-cyclohexanedicarboxylic acid. This copolyamide melted in the vicinity of 300–320°. Fibers made from this copolyamide had the following properties: 4.4 grams per denier tensile strength, 15 percent elongation, a hot bar sticking temperature of 240° C. and an elastic modulus of 72. The fibers are of value for use in tire cords because of their high modulus. Copolyamides were prepared employing from 10 to 50% of the para-isomer in corresponding partial replacement of the meta-isomer of this example, whereupon copolyamides of similar characteristics were obtained having somewhat increased melting temperatures.

*Example 6.—Copolyamide*

A copolyamide was prepared from m-xylene-α,α'-diamine, 0.8 mole proportions of adipic acid and 0.2 mole proportions of oxalic acid. This copolyamide softened in the range of 260°–290° C. When melt-spun it produced strong, elastic fibers. This copolyamide was formed into transparent films and molded objects. It was soluble in aqueous alcohol and aqueous acetic acid.

*Example 7.—Copolyamide*

A copolyamide was prepared from m-xylene-α,α'-diamine, 0.7 mole adipic acid and 0.3 mole oxalic acid. This copolyamide softened in the range of 270°–315° C. It was used in the formation of films, fibers and molded objects having excellent physical and chemical characteristics as discussed hereinabove.

Additional copolyamides were prepared as described in Examples 6 and 7 employing oxalic acid as the upgrading component in proportions of from 10 mole percent of the bifunctional dicarboxy compounds up to 75 mole percent of the bifunctional dicarboxy compounds. Mole proportions of oxalic acid up to 75 mole percent can be employed when the aliphatic dicarboxy compound containing from 6 to 12 carbon atoms is one of such compounds containing the higher range of carbon atoms, e.g. brassylic acid. Likewise, when such dicarboxy compounds (e.g. azelaic acid or brassic acid) are employed, it may be advantageous in some instances to substitute the para isomer for some of the m-xylene-α,α'-diamine as discussed hereinabove.

The copolyamides produced in accordance with this invention are soluble in various volatile solvents such as acetic acid, formic acid, dichloroacetic acid, trifluoroacetic acid, dimethylformamide, dimethylacetamide, and butyrolactone, etc.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A linear highly polymeric fiber-forming copolyamide of (1) an amine which is a xylene-α,α'-diamine, at least half thereof being the meta isomer, any balance being the para isomer, with (2) a mixture of aliphatic dicarboxy compounds composed of (a) at least 25 mole percent of said mixture of a saturated aliphatic dicarboxy compound containing from about 6 to about 12 carbon atoms, and (b) at least 10 mole percent of an upgrading acid selected from the group consisting of oxalic acid and trans-1,4-cyclohexanedicarboxylic acid, which copolyamide is characterized by an increased melting point contributed to the properties of the copolyamide by said upgrading acid.

2. A copolyamide as defined by claim 1 wherein said amine is composed of m-xylene-α,α'-diamine and said mixture of aliphatic dicarboxy compounds is composed of from 50 to 90 mole percent of adipic acid and from 10 to 50 mole percent of trans-1,4-cyclohexanedicarboxylic acid.

3. A copolyamide as defined by claim 1 wherein said amine is composed of m-xylene-α,α'-diamine and said mixture of aliphatic dicarboxy compounds is composed of from 50 to 90 mole percent of sebacic acid and from 10 to 50 mole percent of trans-1,4-cyclohexanedicarboxylic acid.

4. A copolyamide as defined by claim 1 wherein said amine is composed of m-xylene-α,α'-diamine and said mixture of aliphatic dicarboxylic compounds is composed of from 50 to 90 mole percent of adipic acid and from 10 to 50 mole percent of oxalic acid.

5. A copolyamide as defined by claim 1 wherein said amine is composed of m-xylene-α,α'-diamine and said mixture of aliphatic dicarboxy compounds is composed of from 50 to 90 mole percent of sebacic acid and from 10 to 50 mole percent of oxalic acid.

6. A copolyamide as defined by claim 1 wherein said amine is composed of m-xylene-α,α'-diamine and said mixture of aliphatic dicarboxy compounds is composed of from 50 to 90 mole percent of 3-methyadipic acid and from 10 to 50 mole percent of trans-1,4-cyclohexanedicarboxylic acid.

7. A fiber of the copolyamide defined by claim 2.
8. A fiber of the copolyamide defined by claim 3.
9. A fiber of the copolyamide defined by claim 4.
10. A fiber of the copolyamide defined by claim 5.
11. A fiber of the copolyamide defined by claim 6.
12. Film of the copolyamide defined by claim 2.
13. Film of the copolyamide defined by claim 3.
14. Film of the copolyamide defined by claim 4.
15. Film of the copolyamide defined by claim 5.
16. Film of the copolyamide defined by claim 6.

References Cited in the file of this patent

UNITED STATES PATENTS

| | | |
|---|---|---|
| 2,130,523 | Carothers | Sept. 20, 1938 |
| 2,163,636 | Spanagel | June 27, 1939 |
| 2,558,031 | Allen | June 26, 1951 |
| 2,625,536 | Kirby | Jan. 13, 1953 |

FOREIGN PATENTS

| | | |
|---|---|---|
| 1,112,203 | France | Nov. 9, 1955 |

OTHER REFERENCES

Hill: Fibres From Synthetic Polymers, Elsevier, 1953, pages 320–322. (Copy in Scientific Library.)

Evans et al.: J. Amer. Chem. Soc., vol. 72, 1950, pages 2018, 2023 and 2024. (Copy in Scientific Library.)